US008646732B2

United States Patent
Birch

(10) Patent No.: US 8,646,732 B2
(45) Date of Patent: Feb. 11, 2014

(54) MECHANICAL ELBOW CLAMP

(75) Inventor: Frank J. Birch, Pawtucket, RI (US)

(73) Assignee: Mueller International, LLC, Atlanta, GA (US)

( * ) Notice: Subject to any disclaimer, the term of this patent is extended or adjusted under 35 U.S.C. 154(b) by 183 days.

(21) Appl. No.: 12/824,303

(22) Filed: Jun. 28, 2010

(65) Prior Publication Data

US 2011/0025041 A1 Feb. 3, 2011

Related U.S. Application Data

(60) Provisional application No. 61/220,737, filed on Jun. 26, 2009.

(51) Int. Cl.
*F16L 3/00* (2006.01)
(52) U.S. Cl.
USPC .................. 248/62; 248/59; 285/64; 285/179
(58) Field of Classification Search
USPC ................. 248/49, 58, 59, 62, 63, 74.1, 74.4; 126/318; 193/2 R; 285/64, 114, 179, 285/93, 119; D23/371
See application file for complete search history.

(56) References Cited

U.S. PATENT DOCUMENTS

| 839,269 | A | | 12/1906 | Clifton |
| 953,707 | A | * | 4/1910 | Pearce ............................ 248/59 |
| 1,359,127 | A | * | 11/1920 | Tedder .......................... 126/318 |
| 4,158,462 | A | * | 6/1979 | Coral ......................... 285/144.1 |
| 5,738,148 | A | * | 4/1998 | Coral et al. ................... 138/120 |

FOREIGN PATENT DOCUMENTS

| JP | 08197435 A | * | 8/1996 |
| JP | 2001322175 A | * | 11/2001 |

OTHER PUBLICATIONS

Birch, Frank; U.S. Provisional Application entitled: Mechanical Elbow Clamp having U.S. Appl. No. 61/220,737, filed Jun. 26, 2009, 11 pgs.

* cited by examiner

*Primary Examiner* — Gwendolyn Baxter
(74) *Attorney, Agent, or Firm* — Taylor English Duma LLP

(57) ABSTRACT

A mechanical elbow clamp, a system using the clamp, and a method of supporting a pipe with the clamp are disclosed. The elbow clamp includes a first clamp and a second clamp. One end of the first clamp is attached to one end of the second clamp. The elbow clamp also includes an upper link, which attaches another end of the first clamp to another end of the second clamp, and a load bearing element attached to the upper link.

20 Claims, 1 Drawing Sheet

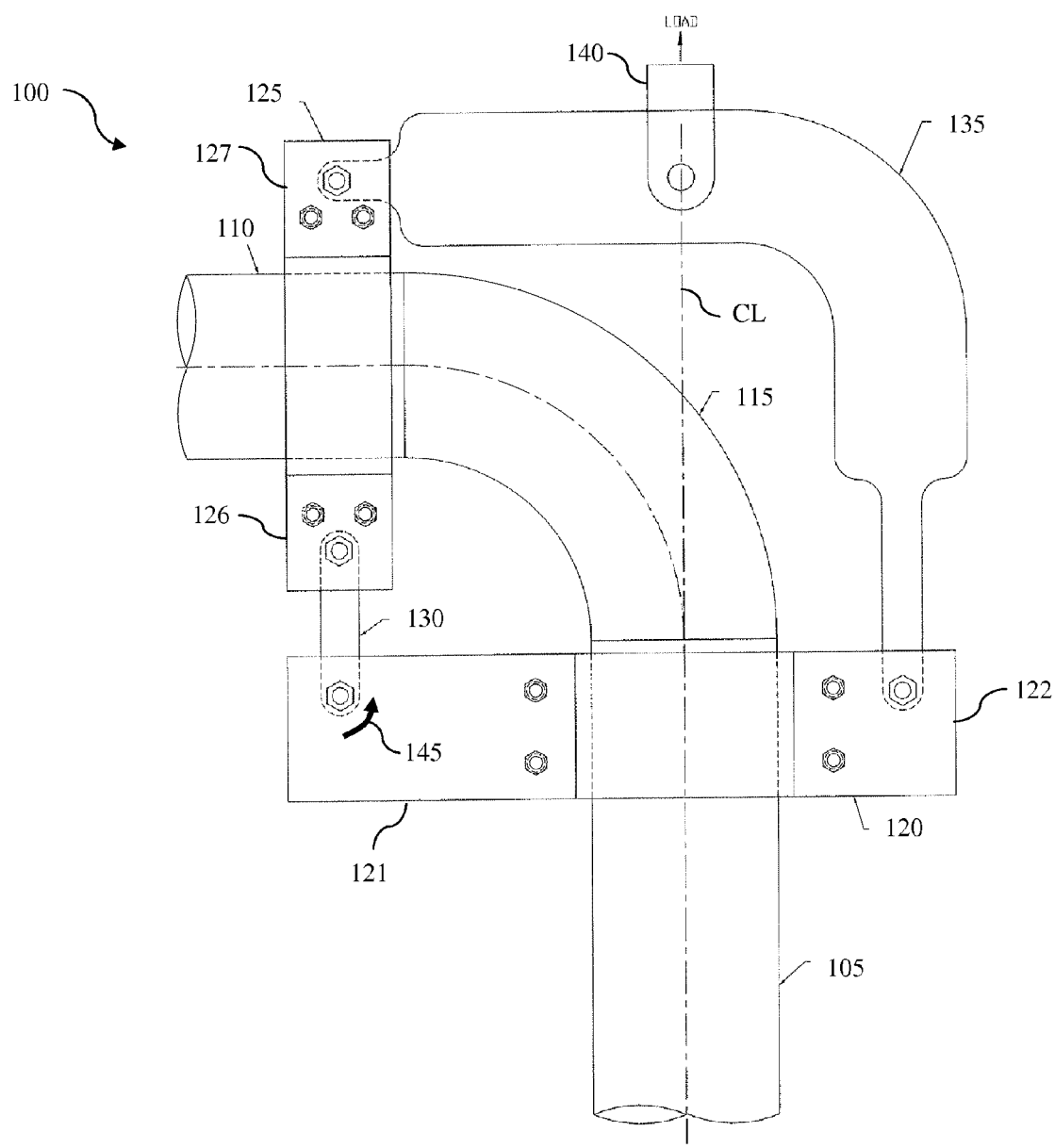

MECHANICAL ELBOW CLAMP

REFERENCE TO RELATED APPLICATIONS

This application claims priority to U.S. provisional application Ser. No. 61/220,737, filed Jun. 26, 2009, entitled "Mechanical Elbow Clamp," which is hereby specifically and entirely incorporated by reference.

BACKGROUND

1. Field of the Invention

The invention is directed to mechanical elbow clamps, systems, and methods. In particular, the invention is directed toward mechanical elbow clamps, systems, and methods for supporting pipes.

2. Background of the Invention

Piping systems are used throughout the world to transport materials from one point to another. Large scale piping systems can include pipes that are several feet in diameter and hundreds of miles in length, such as the Trans-Alaska Pipeline System. While small scale piping systems can have pipes that are smaller than an inch in diameter and only transport materials a few feet, such as household plumbing systems. Each type of systems has many unique features and also many features in common. For instance, many piping systems are supported off the ground or floor.

There are a number of devices to support piping systems, including but not limited to risers, hangers, saddle supports, pipe stanchions, pipe rolls, trapeze, pipe rings, etc. Each of these devices can be used to support a pipe from the floor, a wall, or from above (e.g. a ceiling). Often it is desirable to have a piping system start off at a lower level and then rise to an upper level. This can be accomplished in a number of ways, including a vertical pipe.

To connect an upper portion of a piping system with a lower portion of a piping system via a vertical pipe, elbow pipes are used at the juncture between the lower portion and the vertical pipe and the juncture between the vertical pipe and the upper portion. While it is possible to support the vertical pipe solely by supporting the lower portion and the upper portion of the piping system, this can put unnecessary strain on the elbow pipes and the joints between the sections of pipe. Furthermore, the weight of not only the vertical pipe, but also the material flowing through the pipe must be taken into consideration. Unlike a horizontal pipe, where additional supports can be added to support the weight of the pipe and the material within the pipe as the length of the pipe increases, on a vertical pipe as the weight of the pipe increases, the same support must bear the increased load. These loads can be in excess of 60,000 pounds.

Often lugs are welded onto the elbow at the top of the vertical pipe. The welded lugs are on the center line of the riser. From these fixtures, supports are attached and hung from a ceiling or other supporting structure. However, the pipes often must endure temperatures of 1000° F. to 1500° F., which, in combination with the load, can cause the welds to eventually start to crack or cause the pipe to start to crack around the point of welding, thereby weakening the infrastructure and compromising the entire piping system. Thus it is desirable to have a supporting device that can support a vertical pipe without being welded to the pipe.

SUMMARY OF THE INVENTION

The present invention overcomes the problems and disadvantages associated with current strategies and designs and provides new tools and methods of supporting an object.

An embodiment of the invention is directed to an elbow clamp. The elbow clamp includes a first clamp and a second clamp. One end of the first clamp is attached to one end of the second clamp. The elbow clamp also includes an upper link attaching another end of the first clamp to another end of the second clamp, and a load bearing element attached to the upper link.

In certain embodiments, the first clamp and the second clamp are adapted to fit around pipes. In certain embodiments, the elbow clamp also includes a lower link. The lower link is used to attached the two clamps. In certain embodiments, the first clamp and the second clamp are each comprised of two "C" shaped halves.

Another embodiment of the invention is directed to a pipe support system. The system includes a vertical pipe and a horizontal pipe attached by an elbow pipe. The system also includes a first clamp attached to the vertical pipe and a second clamp attached to the horizontal pipe. One end of the first clamp is attached to one end of the second clamp. The system also includes an upper link attaching another end of the first clamp to another end of the second clamp, and a load bearing element attached to the upper link.

In certain embodiments, the system also includes a lower link. The lower link attaches the first clamp to the second clamp. In certain embodiments, the first clamp and the second clamp are each made of two "C" shaped halves. Preferably, the first clamp and the second clamp are perpendicular to each other and the first clamp and the second clamp rotate with respect to each other. In certain embodiments, the load bearing element is positioned in line with a center line of the vertical pipe. In certain embodiments, the first clamp uses friction to support the vertical pipe. The configuration allows the load to be borne along the centerline of a riser.

Another embodiment of the invention is directed to a method of supporting a vertical pipe coupled to a horizontal pipe by an elbow pipe. The method includes the steps of attaching a first clamp to the vertical pipe, attaching a second clamp to the horizontal pipe, attaching one end of the first clamp to one end of the second pipe, attaching an upper link to another end of the first clamp, attaching the upper link to another end of the second clamp, and attaching the upper link to a support structure.

In certain embodiments, the first clamp is attached the second clamp by a lower link. In certain embodiments, the support structure is a ceiling. Preferably, the upper link is coupled to the support structure at a point in line with a center line of the vertical pipe. In certain embodiments, the first clamp and the second clamp can rotate with respect to each other so that the first clamp rotates into the outer wall of the vertical pipe and creates a point of high friction. In certain embodiments, the method also includes the step of arranging the second clamp to be perpendicular to the first clamp. Preferably, the first clamp and the second clamp are each comprised of two "C" shaped halves.

Other embodiments and advantages of the invention are set forth in part in the description, which follows, and in part, may be obvious from this description, or may be learned from the practice of the invention.

DESCRIPTION OF THE DRAWING

The invention is described in greater detail by way of example only and with reference to the attached drawing, in which:

FIG. 1 is a side view of a mechanical elbow clamp.

DESCRIPTION OF THE INVENTION

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention A problem in the art capable of being solved by the embodiments of the present invention is supporting a vertical pipe without welding lugs to the pipe. It has been surprisingly discovered that a mechanical elbow clamp can support the large load of a vertical pipe without causing damage to the pipe.

FIG. 1 shows a side view of a mechanical elbow clamp 100. Mechanical elbow clamp 100 supports vertical pipe 105, which is attached to horizontal pipe 110 via elbow pipe 115. Mechanical elbow clamp 100 includes a riser clamp 120 and a standard clamp 125. Each clamp is preferable made of two "C" shaped halves coupled together. The two halves may be coupled together by any method known in the art, including but not limited to, bolts, welding, rivets, snap couplings, and adhesive. Each half of each clamp wraps halfway around a pipe, and when coupled together, each clamp wraps around the entire circumference of a pipe. Preferably, each clamp is in direct contact with a pipe. However, in certain embodiments, a buffer is placed between a clamp and a pipe. The clamps may be made out of any material, including but not limited to metal, plastic, synthetic materials, and fibers.

Riser clamp 120 is preferably coupled to vertical pipe 105 and standard clamp 125 is preferably coupled to horizontal pipe 110. In such a configuration, riser clamp 120 and standard clamp 125 are arranged substantially perpendicularly to each other. In certain embodiments, especially where horizontal pipe 110 and vertical pipe 105 are not in a perpendicular configuration, riser clamp 120 and standard clamp 125 are at an obtuse or acute angle to each other.

While mechanical elbow clamp 100 is preferably used to support pipes, mechanical elbow clamp 100 can be used to support any object, including but not limited to conduits, wires, cables, building materials, beams, and gutters. Preferably, in the embodiments used with pipes, the pipe diameter is less than 60 inches. More preferably the pipe diameter is between ½ an inch and 42 inches. Most preferably, the diameter is between 2 inches and 24 inches.

The interior end 121 of riser clamp 120 and the interior end 126 of standard clamp 125 may be directly coupled to each other or coupled via a lower link 130. Preferably, riser clamp 120 and standard clamp 125 are able to move with respect to each other. Riser clamp 120 and standard clamp 125 may be coupled, whether directly or via lower link 130, by any method known in the art, including but not limited to bolts, studs, and rivets.

In certain embodiments, the exterior end 122 of riser clamp 120 and the exterior end 127 of standard clamp 125 are coupled via an upper link 135. Upper link 135 may be coupled to the exterior end 122 of riser clamp 120 and the exterior end 127 of standard clamp 125 by any method known in the art, including but not limited to bolts, studs, and rivets. Preferably, upper link 135 allows riser clamp 120 and standard clamp 125 to move with respect to each other.

In certain embodiments, upper link 135 and riser clamp 120 are coupled to at least one point on riser clamp 120 that is along the centerline CL of vertical pipe 105. Upper link may be coupled to riser clamp 120 by any method known, including but not limited to bolts, welds, studs, and rivets. Preferably, upper link 135 is coupled to both halves of riser clamp 120. More preferably, the points at which upper link 135 is coupled to the two halves of riser clamp 120 are diametrically opposed.

Upper link is coupled to load bearing element 140. Preferably, the center of load bearing element 140 is along centerline CL. Due to the mechanical linkage, the load placed on load bearing element 140 is transferred to both standard clamp 125 and riser clamp 120, thus spreading the load throughout mechanical elbow clamp 100.

In certain embodiments, lower link 130 prevents riser clamp 120 from moving up vertical pipe 105. At the same time, lower link 130 causes riser clamp 120 to rotate into vertical pipe 105 in the direction shown by arrow 145. The resulting normal force permits vertical pipe 105 to support riser clamp 120 via friction.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:

1. An elbow clamp, comprising:
a first clamp for coupling to a load;
a second clamp for coupling to the load at an angle from the first clamp, wherein a first end of the first clamp is coupled to a first end of the second clamp;
a rigid upper link coupling a second end of the first clamp to a second end of the second clamp such that the second end of the first clamp is a fixed distance from the second end of the second clamp;
a rigid lower link extending vertically and coupling the first end of the first clamp to the first end of the second clamp; and
a load bearing element coupled to the upper link.

2. The elbow clamp of claim 1, wherein the first clamp and the second clamp are shaped to fit around pipes.

3. The elbow clamp of claim 1, wherein the first clamp and the second clamp are each comprised of two "C" shaped halves.

4. The elbow clamp of claim 1, wherein the first clamp and the second clamp are perpendicular to each other.

5. The elbow clamp of claim 1, wherein the first clamp and the second clamp are free to rotate with respect to each other.

6. The elbow clamp of claim 1, wherein the load bearing element extends vertically from the upper link.

7. The elbow clamp of claim 1, wherein the load bearing element is positioned in line with a center line of a vertical pipe.

8. A pipe support system, comprising:
a vertical pipe defining a center line;
a horizontal pipe;
an elbow pipe coupling the vertical pipe to the horizontal pipe;
a first clamp coupled to the vertical pipe;
a second clamp coupled to the horizontal pipe, wherein a first end of the first clamp is coupled to a first end of the second clamp;
a rigid upper link coupling a second end of the first clamp to a second end of the second clamp such that the second end of the first clamp is a fixed distance from the second end of the second clamp; and
a load bearing element coupled to the upper link, wherein the load bearing element is positioned in line with the center line of the vertical pipe.

9. The system of claim 8, further comprising a lower link, wherein the lower link couples the first end of the first clamp to the first end of the second clamp.

10. The system of claim 9, wherein the lower link extends vertically between the first end of the first clamp and the first end of the second clamp.

11. The system of claim 8, wherein the first clamp and the second clamp are each comprised of two "C" shaped halves.

12. The system of claim 8, wherein the first clamp and the second clamp are perpendicular to each other.

13. The system of claim 8, wherein the first clamp and the second clamp are free to rotate with respect to each other.

14. The system of claim 8, wherein the first clamp uses friction to support the vertical pipe.

15. The system of claim 8, wherein the load bearing element extends vertically from the upper link.

16. A method of supporting a vertical pipe coupled to a horizontal pipe by the use of an elbow pipe, the method comprising:

placing the elbow pipe between and in fluid communication with both the vertical pipe and the horizontal pipe;

coupling a first clamp to the vertical pipe, the vertical pipe defining a center line;

coupling a second clamp to the horizontal pipe;

coupling a first end of the first clamp to a first end of the second clamp;

coupling a rigid upper link to a second end of the first clamp;

coupling the rigid upper link to a second end of the second clamp such that the second end of the first clamp is a fixed distance from the second end of the second clamp; and coupling the rigid upper link to a load bearing element, wherein the load bearing element is positioned in line with the center line of the vertical pipe.

17. The method of claim 16, wherein the step of coupling the first end of the first clamp to the first end of the second clamp includes coupling the first end of the first clamp to a lower link and coupling the first end of the second clamp to the lower link.

18. The method of claim 16, further comprising enabling the first clamp and the second clamp to rotate with respect to each other so that the first clamp rotates into an outer wall of the vertical pipe and creates a point of high friction.

19. The method of claim 16, further comprising the step of arranging the second clamp to be perpendicular to the first clamp.

20. The method of claim 16, wherein the first clamp and the second clamp are each comprised of two "C" shaped halves.

\* \* \* \* \*